UNITED STATES PATENT OFFICE.

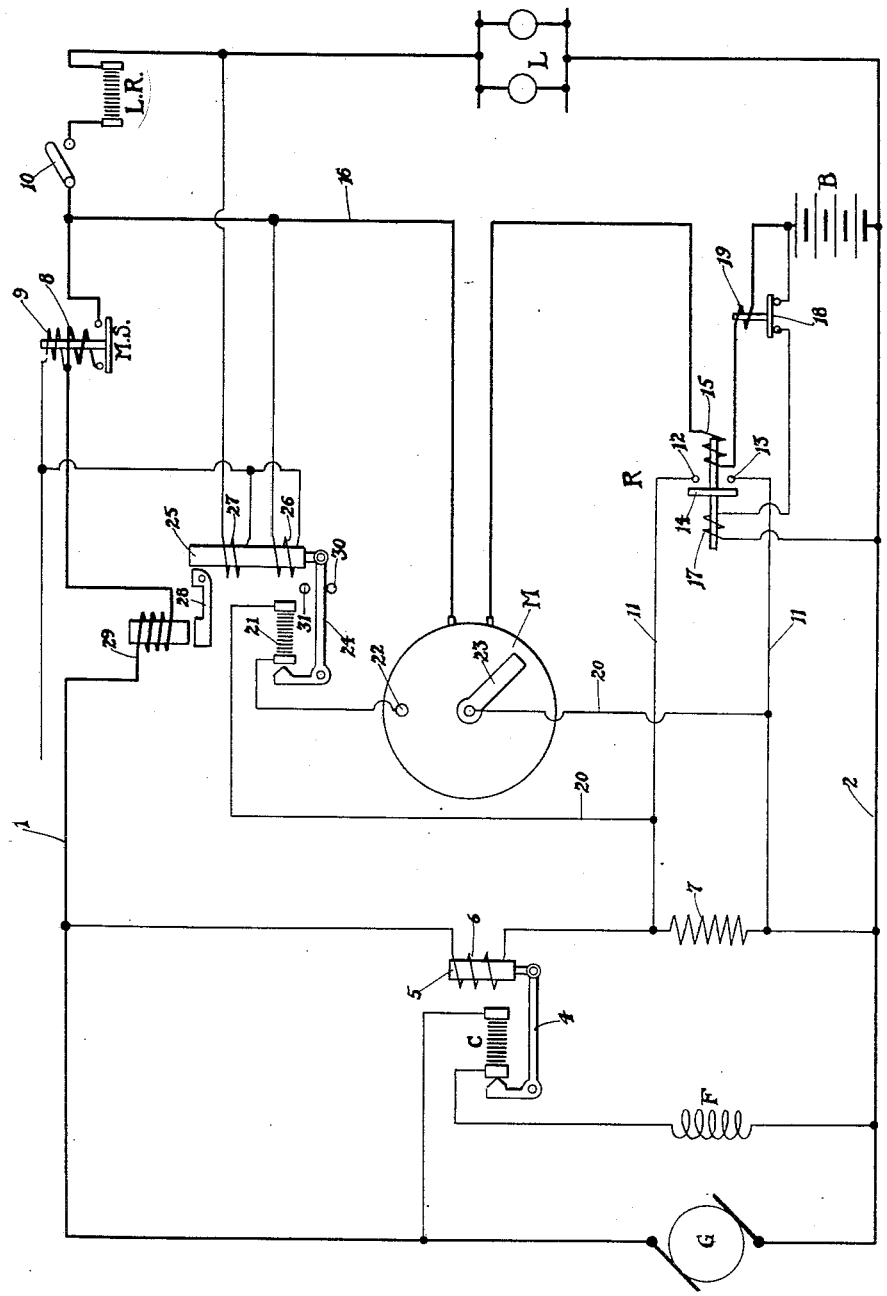

LEONARD A. WATSON, OF BROOKLYN, NEW YORK, ASSIGNOR TO THE SAFETY CAR HEATING AND LIGHTING COMPANY, OF NEW YORK, N. Y., A CORPORATION OF NEW JERSEY.

SYSTEM OF ELECTRICAL DISTRIBUTION.

1,353,870.  Specification of Letters Patent.  Patented Sept. 28, 1920.

Application filed September 19, 1919. Serial No. 325,009.

*To all whom it may concern:*

Be it known that I, LEONARD A. WATSON, a citizen of the United States, residing at Brooklyn, in the county of Kings and State of New York, have invented certain new and useful Improvements in Systems of Electrical Distribution, of which the following is a full, clear, and exact description, such as will enable others skilled in the art to which it appertains to make and use the same.

This invention relates to systems of electrical distribution, and more particularly to car lighting systems wherein an axle-driven variable speed generator having a shunt field winding is employed to charge a storage battery and supply current to lamps.

It is an object of the invention to provide an improved system of the character mentioned wherein the generator is efficiently regulated to meet the service requirements of the various elements.

It is a further object of the invention to provide an improved car lighting system wherein the regulator for the generator includes a voltage coil to maintain substantial constancy of generator voltage as against speed changes and as against gradual changes in the counter E. M. F. of the battery, and wherein the setting of said coil is established at intervals to vary the value of voltage constancy for protection of the system during battery charging and thereafter.

Other objects and advantages will be in part noted hereinafter in connection with the following description of the accompanying drawing, which illustrates a typical embodiment of the invention and wherein are represented the elements of the system and their circuit connections.

As shown, an axle-driven variable speed generator G is connected by mains 1 and 2 to charge a storage battery B and supply lamps L. The generator has a shunt field winding F, the strength of which is controlled through a carbon pile variable resistance C, the degree of compression of the latter being in turn governed, through the medium of bell crank 4 and core 5, by a voltage coil 6 connected across mains 1 and 2 having a resistance 7 adapted for inclusion in circuit therewith under certain conditions, and for exclusion therefrom under other conditions, as will be described. A well-known form of main switch MS is provided to control the continuity of line 1 by the action of a series coil 8 and a shunt coil 9 designed to close the switch when and while the voltage of the generator is above a predetermined value, and to open the switch when the generator voltage drops, for example, during train deceleration and stoppage. A switch 10 is provided in the lamp circuit, and of course additional individual lamp switches may be utilized where desired. A voltage regulator is represented as LR and is also included in the lamp branch to control the value of voltage constancy to be applied on the lamps during supply thereto from the generator or from the battery.

In a system where the regulation of the generator is predominantly effected at all times by a voltage responsive coil, it is desirable to decrease the value of generator voltage during an initial period of battery charging. To accomplish this end there may be provided a shunt 11, including contacts 12 and 13 about resistance 7, and a relay R including a switch element 14 is employed to close or open circuit across the contacts 12 and 13 for short-circuiting the resistance 7 only while the counter E. M. F. of the battery is relatively low. Switch element 14 is actuated to complete shunt 11 by a series coil 15 connected in the battery branch 16 and designed to respond to excessive charging current, and element 14 is actuated to break the shunt 11 by a voltage coil 17 adapted for connection across the battery B through switch element 18, in turn governed by a series coil 19, also connected in the battery branch 16 but designed as an under-load coil to drop the switch 18 only when the charging current diminishes below a predetermined value.

Means, including an ampere hour meter M, is employed to establish an alternative shunt 20 about resistance 7 at the end of a predetermined charge to set the regulating coil 6 to maintain a reduced value of generator voltage for preventing injurious battery over-charging. Shunt 20 includes in series therewith a relatively small variable resistance, such as a carbon pile 21, and the shunt is made or broken across a terminal contact 22 and a movable contact 23 of the meter M. Contact 23 may, for example, rotate counter-clockwise during battery charging and clockwise during battery discharging. The degree of compression of the carbon pile 21 is established at intervals during normal periods of regulating ineffectiveness of the coil 6 by electro-responsive means, then influenced only by the battery voltage either when it is discharging to the lamps or is idle. More specifically, the carbon pile 21 is governed through the medium of a bell crank 24 and a connected core 25, the latter being positioned by a voltage coil 26 connected across the battery and a voltage coil 27 connected across the lamps. The coils 26 and 27 are permanently connected but the core 25 is restrained against movement at all times save when the coils mentioned are influenced only by the battery voltage. For example, there may be provided a locking lever 28 pivoted adjacent an extremity which is adapted to wedge against the core 25 when the opposite extremity of the lever is attracted by a winding 29. The winding 29 in turn is adapted to attract the free end of lever 28 while the main switch is closed, and accordingly core 25 is restrained against movement at all times while the generator voltage is applied to the battery and the lamps. Stops 30 and 31 may be employed to limit the movement of the core 25.

With one design of the system represented its operation may be briefly described as follows: If the battery is in a depleted state of charge, shunt 20 will be broken across the meter M, and, on account of the relatively low counter E. M. F. of the battery, a charging current in excess of that for which the coil 15 is designed to actuate the switch element 14 would be delivered to the battery, whereupon coil 15 would effect completion of the shunt 11 and short-circuit resistance 7 to reduce the value of voltage constancy maintained by the regulating coil 6. This condition would obtain until the counter E. M. F. of the battery gradually increased and the charging current consequently tapered to an amount below that for which the under-load coil 19 is designed to release the switch element 18, whereupon relay coil 17 attracts the switch element 14 to break the shunt 11 to thereby set the regulating coil 6 to maintain a higher value of generator voltage constancy during the remaining period of battery charging. When the meter M, by current measurement, indicates a predetermined completion of battery charging, shunt 20 about resistance 7 is completed across meter contacts 22 and 23 to again set the regulating coil 6 for reducing the generator voltage. At normal recurring intervals, however, during battery charging and thereafter, when the generator voltage is not applied to the battery, for example, during a period of train stoppage, core 25 is released by locking lever 28 and the core consequently balanced by the action of the voltage coil 26 alone, or voltage coils 26 and 27 together if the battery is on discharge. These coils are designed to establish the setting of carbon pile 21 in accordance with the condition of the battery for charge, as indicated by its voltage. Accordingly, if the battery is subnormal, core 25 may rest against stop 30, and when the generator voltage rebuilds the core 25 will be locked in the position indicated, so that when the meter M completes shunt 20 a major amount of current through coil 6 will be shunted about resistance 7 and the regulation of the generator established at a low value to protect the then sub-normal battery against objectionable overcharge. If, however, the battery is normal, coils 26 and 27, during an interval of regulating ineffectiveness of coil 6, will raise the core 25 to bring bell crank 24 against stop 31, thereby increasing the effect of resistance 21 and decreasing the relative amount of resistance 7 to be shunted through the meter at the end of battery charging, whereby, with the normal battery, the regulating coil 6 will be set to maintain a relatively higher value of generator voltage constancy during the succeeding period of regulating effectiveness of the coil 6. This relatively higher value of generator voltage constancy will be correct to protect the then normal battery against objectionable over-charging.

It is to be understood that certain features of the invention as described are capable of combination with systems having regulators of other character and that such combinations may be made without sacrifice of certain of the attendant advantages of this invention and without departure from the scope of the appended claims.

Having described my invention what I claim as new and desire to secure by Letters Patent, is:—

1. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions, a variable resistance adapted for connection in shunt about said first-mentioned resistance, an ampere hour meter connected in the battery branch and indicative of the state of battery charge by currrent measurement adapted to include said variable resistance in shunt with said first-mentioned resistance at the end of battery charging, and means to control said variable resistance in accordance with the voltage of said battery.

2. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions, a variable resistance adapted for connection in shunt about said first-mentioned resistance, an ampere hour meter connected in the battery branch and indicative of the state of battery charge by current measurement adapted to include said variable resistance in shunt with said first-mentioned resistance at the end of battery charging, and electro-responsive means to control said variable resistance but thus operative only during intervals of regulating ineffectiveness of said coil.

3. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions, a variable resistance adapted for connection in shunt about said first-mentioned resistance, an ampere hour meter connected in the battery branch indicative of the state of battery charge by current measurement adapted to include said variable resistance in shunt with said first-mentioned resistance at the end of battery charging, and electro-responsive means to set said variable resistance at intervals when the voltage of the generator is below a predetermined value.

4. In combination, a variable speed generator, a battery adapted for connection to be charged thereby, a regulator including a voltage coil tending when effective to maintain substantial constancy of generator voltage, a resistance adapted for inclusion in the circuit of said coil under certain conditions, a variable resistance adapted for connection in shunt about said first-mentioned resistance, an ampere hour meter connected in the battery branch indicative of the state of battery charge by current measurement adapted to include said variable resistance in shunt with said first-mentioned resistance at the end of battery charging, electro-responsive means including a voltage coil to control said variable resistance, and means to insure controlling effectiveness of said last-mentioned coil only during intervals of open circuit between said generator and said battery.

5. In combination, a variable speed generator having a shunt field winding, a battery adapted for connection to be charged thereby, a regulator including a voltage coil tending when effective to maintain substantial constancy of generator voltage as against speed changes and as against gradual changes in the counter E. M. F. of said said battery, a resistance in the circuit of said coil, electro-responsive means dependent on the instant amount of charging current to shunt said resistance under certain conditions, a variable resistance adapted under other conditions to be included in shunt about said first-mentioned resistance, an ampere hour meter to include said variable resistance in said shunt after predetermined battery charging, and electro-responsive means to control said variable resistance at intervals in accordance with the voltage of said battery.

In testimony whereof I affix my signature, in the presence of two witnesses.

LEONARD A. WATSON.

Witnesses:
HELEN M. SEAMANS,
DAVID A. WOODCOCK.